(12) United States Patent
McGarry et al.

(10) Patent No.: US 8,576,436 B2
(45) Date of Patent: Nov. 5, 2013

(54) TWO-SIDED PRINT DATA SPLITTING

(75) Inventors: Colman McGarry, Dundee (GB); Joe Jennings, Angus (GB)

(73) Assignee: NCR Corporation, Duluth, GA (US)

( * ) Notice: Subject to any disclaimer, the term of this patent is extended or adjusted under 35 U.S.C. 154(b) by 1456 days.

(21) Appl. No.: 11/765,605

(22) Filed: Jun. 20, 2007

(65) Prior Publication Data
US 2008/0316534 A1 Dec. 25, 2008

(51) Int. Cl.
*H04N 1/40* (2006.01)

(52) U.S. Cl.
USPC .......................................... 358/1.18; 358/448

(58) Field of Classification Search
USPC ........... 358/1.18, 1.9, 2.1, 448–449, 488, 498
See application file for complete search history.

(56) References Cited

U.S. PATENT DOCUMENTS

| | | | |
|---|---|---|---|
| 3,466,423 A | 9/1969 | Janning |
| 3,518,406 A | 6/1970 | Janning |
| 3,947,854 A | 3/1976 | Hansen et al. |
| 4,167,392 A | 9/1979 | Defago |
| RE30,116 E | 10/1979 | Maalouf |
| 4,309,255 A | 1/1982 | Gendler et al. |
| 4,507,669 A | 3/1985 | Sakamoto et al. |
| 4,708,500 A | 11/1987 | Bangs et al. |
| 4,956,251 A | 9/1990 | Washizu et al. |
| 4,965,166 A | 10/1990 | Hosoi et al. |
| 4,987,118 A | 1/1991 | Murata et al. |
| 5,055,373 A | 10/1991 | Saeki et al. |
| 5,101,222 A | 3/1992 | Hakkaku |
| 5,132,704 A | 7/1992 | Nakagawa |
| 5,196,297 A | 3/1993 | Dombrowski, Jr. et al. |
| 5,214,750 A | 5/1993 | Minowa et al. |
| 5,266,550 A | 11/1993 | Asajima et al. |
| 5,272,127 A | 12/1993 | Mandoh et al. |
| 5,284,816 A | 2/1994 | Stephenson |
| 5,319,392 A | 6/1994 | Durst et al. |
| 5,366,952 A | 11/1994 | Granquist |
| 5,398,305 A | 3/1995 | Yawata et al. |
| 5,428,714 A | 6/1995 | Yawata et al. |
| 5,437,004 A | 7/1995 | Miyasaka et al. |

(Continued)

FOREIGN PATENT DOCUMENTS

| | | |
|---|---|---|
| EP | 0947340 | 10/1999 |
| GB | 2250478 | 6/1992 |
| JP | 58051172 | 3/1983 |
| WO | WO 2004/077001 A1 | 9/2004 |

OTHER PUBLICATIONS

JP Abstract, vol. 007, No. 063 (M-200), Mar. 16, 1983 & JP 57-208298 A (Ricoh KK), Dec. 21, 1982.

(Continued)

*Primary Examiner* — Thomas D Lee
*Assistant Examiner* — Stephen M Brinich
(74) *Attorney, Agent, or Firm* — Michael Chan (57) ABSTRACT

Methods of, and apparatus for, splitting data for two-sided printing are provided. In one embodiment, a method of splitting data for printing by a first and a second print head of a two-sided printer is provided, the method comprising: identifying a portion of the data transverse to a print direction comprising no information for printing, designating a portion of the data prior to the identified portion for printing by the first print head, and designating a portion of the data following the identified portion for printing by the second print head.

38 Claims, 7 Drawing Sheets

(56) References Cited

U.S. PATENT DOCUMENTS

| | | |
|---|---|---|
| 5,555,349 A | 9/1996 | Miyasaka et al. |
| 5,584,590 A | 12/1996 | Ito et al. |
| 5,594,653 A | 1/1997 | Akiyama et al. |
| 5,629,259 A | 5/1997 | Akada et al. |
| 5,639,169 A | 6/1997 | Aruga |
| 5,667,303 A | 9/1997 | Arens et al. |
| 5,677,722 A | 10/1997 | Park |
| 5,688,057 A | 11/1997 | Wright et al. |
| 5,692,110 A | 11/1997 | Miyasaka et al. |
| 5,707,925 A | 1/1998 | Akada et al. |
| 5,710,094 A | 1/1998 | Minami et al. |
| 5,755,521 A | 5/1998 | Ito et al. |
| 5,756,188 A | 5/1998 | Reiter et al. |
| 5,763,356 A | 6/1998 | Ueno et al. |
| 5,781,823 A | 7/1998 | Isobe et al. |
| 5,789,340 A | 8/1998 | Brust et al. |
| 5,792,725 A | 8/1998 | Simpson et al. |
| 5,794,530 A | 8/1998 | Dobashi et al. |
| 5,800,081 A | 9/1998 | Teradaira et al. |
| 5,815,191 A | 9/1998 | Michielsen et al. |
| 5,846,900 A | 12/1998 | Reiter et al. |
| 5,876,836 A | 3/1999 | Imamura et al. |
| 5,883,043 A | 3/1999 | Halbrook, Jr. et al. |
| 5,886,725 A | 3/1999 | Miyadera et al. |
| 5,918,910 A | 7/1999 | Stillwagon et al. |
| 5,964,541 A | 10/1999 | Murison et al. |
| 6,000,867 A | 12/1999 | Yoshii et al. |
| 6,095,414 A | 8/2000 | Long et al. |
| 6,130,185 A | 10/2000 | Narita et al. |
| 6,150,067 A | 11/2000 | Koike et al. |
| 6,151,037 A | 11/2000 | Kaufman et al. |
| 6,210,777 B1 | 4/2001 | Vermeulen et al. |
| 6,350,072 B1 | 2/2002 | Nunes et al. |
| 6,388,692 B1 | 5/2002 | Iwata et al. |
| 6,523,951 B2 | 2/2003 | Takeya et al. |
| 6,524,000 B1 | 2/2003 | Roth |
| 6,544,925 B1 | 4/2003 | Prusik et al. |
| 6,562,755 B1 | 5/2003 | Halbrook, Jr. et al. |
| 6,705,786 B2 | 3/2004 | Trovinger |
| 6,759,366 B2 | 7/2004 | Beckerdite et al. |
| 6,784,906 B2 | 8/2004 | Long et al. |
| 6,801,233 B2 | 10/2004 | Bhatt et al. |
| 6,812,943 B1 | 11/2004 | Day et al. |
| 6,906,735 B2 | 6/2005 | Bhatt et al. |
| 6,982,737 B2 | 1/2006 | Elko et al. |
| 7,192,904 B2 | 3/2007 | Iwasaki et al. |
| 2003/0025779 A1 | 2/2003 | Miyazaki |
| 2004/0084631 A1 | 5/2004 | Spoonhower et al. |
| 2005/0020387 A1 | 1/2005 | Kennedy, III |
| 2005/0164881 A1 | 7/2005 | Kenney et al. |
| 2006/0072001 A1 | 4/2006 | Klein |
| 2006/0159503 A1 | 7/2006 | Janning |
| 2006/0289633 A1 | 12/2006 | Moreland et al. |
| 2007/0211132 A1* | 9/2007 | Lyons et al. .................. 347/190 |

OTHER PUBLICATIONS

JP Abstract, vol. 007, No. 081 (M-105), Apr. 5, 1983 & JP 58-008668 A (Shinko Denki KK), Jan. 18, 1983.

JP Abstract, Vo. 015, No. 194 (M-1114), May 20, 1991 & JP 03-051149 A (Fujitsu General Ltd.), Mar. 5, 1991.

JP Abstract, vol. 2000, No. 24 May 11, 2001 & JP 2001-199095 A (Alps Electric Co. Ltd.), Jul. 24, 2001.

JP Abstract, vol. 1998, No. 08, Jun. 30, 1998 & JP 10-076713 A (Sony Corp.) Mar. 24, 1998.

JP Abstract, vol. 010, No. 151 (M-483), May 31, 1986 & JP 61-003765 A (Konishiroku Shashin Kogyo KK), Jan. 9, 1986.

JP Abstract, vol. 016, No. 041 (M-1206), Jan. 31, 1992 & JP 03-246091 A (Canon Inc.), Nov. 1, 1991.

Boca Systems Micro Plus 2S 2 Sided Printer product brochure which came to the attention of Applicant at a Chicago tradeshow during the summer of 2002.

APTi PowerEcoT R2412 printer brochure, which was came to the attention of Applicant in the summer of 2007, and was translated by Applicant's Japanese Office in the fall of 2007.

* cited by examiner

FIG. 1

202     Your Store
        Any Town
        Today

| | |
|---|---|
| Coffee | 1.29 |
| Carrots | 0.50 |
| Oranges | 3.23 |
| Kiwi | 1.23 |
| Apples | 1.79 |
| Ham | 4.23 |
| Bread | 2.31 |
| Beef | 5.34 |
| Custard | 1.31 |
| Milk | 2.91 |
| Juice | 1.98 |
| Butter | 2.79 |
| Cereal | 2.49 |
| Rice | 3.11 |
| Pasta | 0.59 |
| Cheese | 2.59 |
| Lettuce | 0.99 |
| Pickles | 1.32 |
| Total | 40.00 |

TWO-SIDED PRINT DATA SPLITTING

BACKGROUND

Dual, or two-sided printing of documents comprises the printing of a first portion of print data on a first side of a document, and a second portion of the print data on a second side of the document, opposite the first side. Two-sided direct thermal printing of documents such as transaction receipts is described in U.S. Pat. Nos. 6,784,906 and 6,759,366 the contents of which are hereby incorporated herein by reference. In two-sided direct thermal printing, a two-sided direct thermal printer is configured to allow concurrent printing on both sides of two-sided thermal media moving along a feed path through the printer. In such printers a thermal print head is disposed on each of two sides of the media for selectively applying heat to one or more thermally sensitive coatings on each side thereof. The coatings change color when heat is applied, by which "printing" is provided on the respective sides.

SUMMARY

In one embodiment, a method of splitting data comprising information for printing on a first and a second side of print media by respective first and second print heads of a two-sided printer is provided, the method comprising: identifying a portion of the data corresponding to a region of print media where none of the information is to be printed, identifying as a first data portion a portion of the data prior to the portion corresponding to the region were none of the information is to be printed, identifying as a second data portion a portion of the data following the portion corresponding to the region were none of the information is to be printed, designating the first data portion for printing by the first print head, and designating the second data portion for printing by the second print head. In other embodiments, one or more of the identified portions of the data may be required to meet one or more predetermined criteria as a condition precedent to designating the first and the second data portions for printing by the first and the second print heads.

Two-sided print data splitting may be performed by a two-sided printer, or by an application program and/or print driver executing on an associated host computer. Variations are possible.

DETAILED DESCRIPTION

By way of example, various embodiments of the invention are described in the material to follow with reference to the included drawings. Variations may be adopted.

Figure 1:
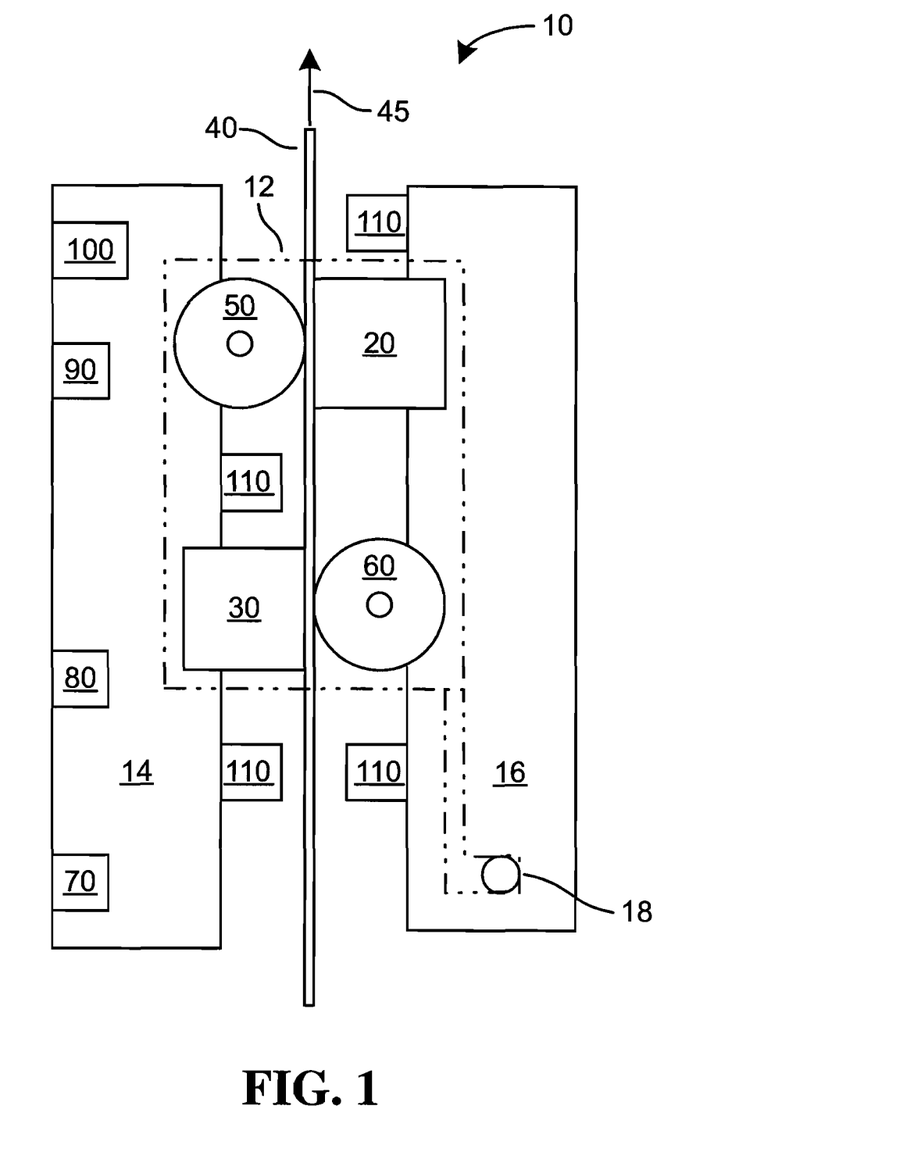
FIG. 1 provides a schematic of a two-sided printer useable for two-sided printing of media such as transaction receipts, tickets and other documents.

FIG. 1 illustrates a schematic of a two-sided printer 10 useable for two-sided printing of, for example, transaction receipts or tickets at time of issue. As shown in FIG. 1, a two-sided printer 10 may have first and second print heads 20, 30 for printing on opposite sides of media 40 moving along a media feed path 45. Additionally, first and second platens 50, 60 may be provided on opposite sides of the media 40 and feed path 45 proximate to the first and second print heads 20, 30 in order to, for example, maintain contact between the first and second print heads 20, 30 and a respective first and second side of the media 40.

Depending on the printer design and/or application, one or both of the first and/or second print heads 20, 30 may comprise thermal, ink jet, impact, and/or any other print head or print means (e.g., laser) suitable for printing and/or imaging of a respective first and/or second side of media 40. Further, the media 40 may be supplied in the form of a roll, fan-fold stock, individual (cut) sheets, and the like, upon which information in text and/or graphic form may be printed on one or both sides of thereof to provide, for example, a voucher, coupon, receipt, ticket or other article or document.

In one embodiment, a two-sided printer 10 comprises a two-sided direct thermal printer having first and second thermal print heads 20, 30, and first and second rotating platens 50, 60 to facilitate printing on one or both sides of two-sided thermal media 40 moving along a media feed path 45 through the printer 10, such as a model 7168 two-sided multifunction printer sold under the RealPOS trademark by NCR Corporation.

A two-sided direct thermal printer 10 may operate on print media 40 comprising, for example, a cellulosic or polymer substrate coated on each of two sides thereof with, interalia, one or more heat sensitive dyes. Two-sided direct thermal printing may further be facilitated by a media 40 including thermal dyes on opposite sides of a substrate having a sufficient thermal resistance to inhibit thermal printing on one side of the media 40 from affecting dye coloration on the opposite side of the media 40 as described in U.S. Pat. Nos. 6,784,906 and 6,759,366.

As shown in FIG. 1, a two-sided printer 10 may further include a communication controller 70 for receiving and/or sending print commands and/or data to and from an associated host computer or terminal such as a point-of-sale (POS) terminal (not shown), an automated teller machine (ATM) (not shown), a self-checkout system (not shown), a personal computer (not shown), and the like. The communications controller 70 may provide for input of data to, or output of data from, the printer 10 pursuant to one or more wired (e.g., parallel, serial/USB, Ethernet, etc) and/or wireless (e.g., 802.11, 802.15, IR, etc) communication protocols, among others.

A further shown in FIG. 1, a two-sided printer 10 may additionally include one or more buffers or memory elements 80 for storage of received print commands and/or data. The one or more buffer or memory elements may comprise one or more volatile (e.g., dynamic or static RAM) and/or non-volatile (e.g., EEPROM, flash memory, etc) memory elements.

In one embodiment, a two-sided printer 10 includes a first and a second memory element or storage area 80. The first memory element 80 may be adapted to store data identified for printing by one of the first and the second print heads 20, 30, while the second memory element 80 is adapted to store data identified for printing by the other of the first and the second print heads 20, 30.

In a further embodiment, a two-sided printer 10 may additionally include a third memory element or storage area 80 in the form of a received print data storage buffer adapted to store data received by the printer 10 for printing by a first and/or a second print head 20, 30 through use of, for example, a communication controller 70. Data from the received print data storage buffer 80 may, then, be retrieved and processed by a processor 90 associated with the printer 10 in order to, for example, split the received print data into a first data portion for printing on a first side of print media 40 by a first print head 20, and a second data portion for printing on a second side of the print media 40 by a second print head 30. Once a split determination has been made, such first and second data portions may, in turn, be stored in respective first and second memory elements or storage areas 80 in preparation for printing by the respective first and second print heads 20, 30.

In still another embodiment, a two-sided printer 10 may further include one or more predefined memory elements or storage areas 80 for storage of predefined print data comprising, for example, one or more of a coupon, a logo, a serialized cartoon, a condition of sale, a graphic or other image, an advertisement, a security feature, rebate or contest information, ticket information, legal information such as a disclaimer or a warranty, and the like. Stored, predefined print data may be selected for printing on one or both sides of two-sided media along with, or separately from, any received print data, such as transaction data from a POS terminal (not shown) associated with the two-sided printer 10.

Selection of predefined print data for printing may be provided for though use of, for example, a switch 100 associated with a two-sided printer 10. In addition to selecting predefined and/or other received print data for printing on a first and/or a second side of media 40, such a switch 100 may enable activation and/or deactivation of one or more printing modes or functions provided for by the printer 10 such as one or more of a single-sided print mode, a double-sided with single-side command mode, a double-sided with double-side command mode, and a double-sided print mode with predefined data, as described in U.S. patent application Ser. No. 11/675,649 entitled "Two-Sided Thermal Print Switch," the contents of which are hereby incorporated by reference herein.

A two-sided printing function switch 100 may be a mechanically operated switch in or on a two-sided printer 10, or an electronic or software switch operated by a printer driver executed on an associated host computer, or by firmware or software resident on the printer 10, and the like. The switch 100 may, for example, be electronically operated in response to a command message or escape sequence transmitted to the printer 10. Printer control language or printer job language ("PCL/PJL"), or escape commands, and the like, may be used. A printer setup configuration program setting, e.g., a setting made through a software controlled utility page implemented on an associated host computer, could also electronically operate a switch 100 of a two-sided printer 10.

A two-sided printing function switch 100 of a two-sided printer 10 may be configured, programmed or otherwise setup to select or otherwise identify (1) data for printing (e.g., internally stored predefined data, externally received transaction data, and the like), (2) which of a first and a second print head 20, 30 will be used to print and/or be used to print particular portions of the selected data, (3) whether data selected for printing is to be printed when the media 40 is moving in a first (e.g., forward) or a second (e.g., backward) direction, (4) in which relative and/or absolute media location, including on which media side, particular data will be printed, (5) in which orientation (e.g., rightside-up, upside-down, angled, and the like) particular data will be printed on the media 40, (6) where to split selected data for printing by a first and a second print head 20, 30, and the like.

For example, in one embodiment, a setting of a two-sided printing function switch 100 may marshal a first data portion comprising approximately one half of selected print data for printing on a first (e.g., front) side of media 40, and a second data portion comprising approximately the remaining half of the selected print data for printing on a second (e.g., reverse) side of the media 40. As previously described, such selected print data may comprise data received by the printer 10 from a host computer such as a POS terminal (not shown), an ATM (not shown), a self-checkout system (not shown), a personal computer (not shown) and the like, and/or predefined data stored in one or more memory or buffer locations 80 of the printer 10. In this manner a document such as a transaction receipt may be generated in which a first portion of the selected data is printed on a first side of the receipt and a second portion comprising the remaining selected data is printed on a second side of the receipt, conserving upon the amount of media 40 required for printing the selected data.

In addition to using a printing function switch 100 associated with a two-sided printer 10, in further embodiments some or all of selected print data may be split and/or designated for printing by a first and/or a second print head 20, 30 prior to being provided to the two-sided printer 10 by, for example, an application program or print driver running on an associated host terminal or computer (not shown). In any event, decisions on where to split selected data for printing by, for example, a first and a second thermal print head 20, 30 associated with a two-sided printer 10 need to be made cognizant of the impact of such decision on the final print output.

For example, where lines of character (e.g., ASCII, Kanji, Hanzi, Hebrew, Arabic, and the like) data are to be split for printing on a first and a second side of media 40 by respective first and second print heads 20, 30 associated with a two-sided printer 10, it is desired to avoid apportioning or otherwise splitting the data such that less than full characters (vertically and/or horizontally) are printed on the respective first and/or the second sides of the media 40. Similarly, where graphic (e.g., raster, bitmap, vector, and the like) data is provided, it is also desired to avoid apportioning or otherwise splitting the data such that less than a complete graphic element, including graphically represented character data, and the like, is printed on a first and/or a second side of the media 40 by a respective first and/or second print head 20, 30.

In one embodiment, where print data in the form of individual character data lines is provided, such data may be split or otherwise apportioned for, for example, printing on a first and a second side of two-sided media, in units of discrete character lines pursuant to, for example, carriage returns or other, associated end-of-line designations representing a break between one or more complete lines of such data.

Where, however, print data in the form of graphic (e.g., raster, bitmap, vector and the like) data is provided, additional difficulty may arise in regard to splitting such data for, for example, printing on a first and a second side of two-sided media without adversely separating one or more discrete print elements. In such case, difficulty in splitting graphic data may be remedied through processing of the data to identify one or more regions within the print data meeting one or more predefined criteria, and then splitting or otherwise apportioning the data for printing by, for example, a first and a second print head 20, 30 at or in the identified regions.

For example, in one embodiment, a method of splitting graphic data for printing may comprise identifying one or more clear or other suitable, semi-clear regions (e.g., regions containing an acceptable, minimum amount of data for printing) in or between discrete graphic print elements transverse to the print direction, and then splitting or otherwise apportioning the data for printing at or within one or more of the identified clear or semi-clear regions. Likewise, in addition to requiring one or more clear or semi-clear regions be identified before splitting or otherwise apportioning graphic print data, such identified clear or semi-clear regions may be required to meet one or more additional predefined criteria prior to permitting print data to be split there at or in. For example, a clear or semi-clear region may be required to be a predetermined physical size, such as a predetermined physical height (e.g., dots, mm, inches, etc), area (e.g., square mm, square inches, etc), and the like, as regards the final image to be printed on print media 40 prior to allowing a split to occur at or within an identified clear or semi-clear region.

Figure 2:
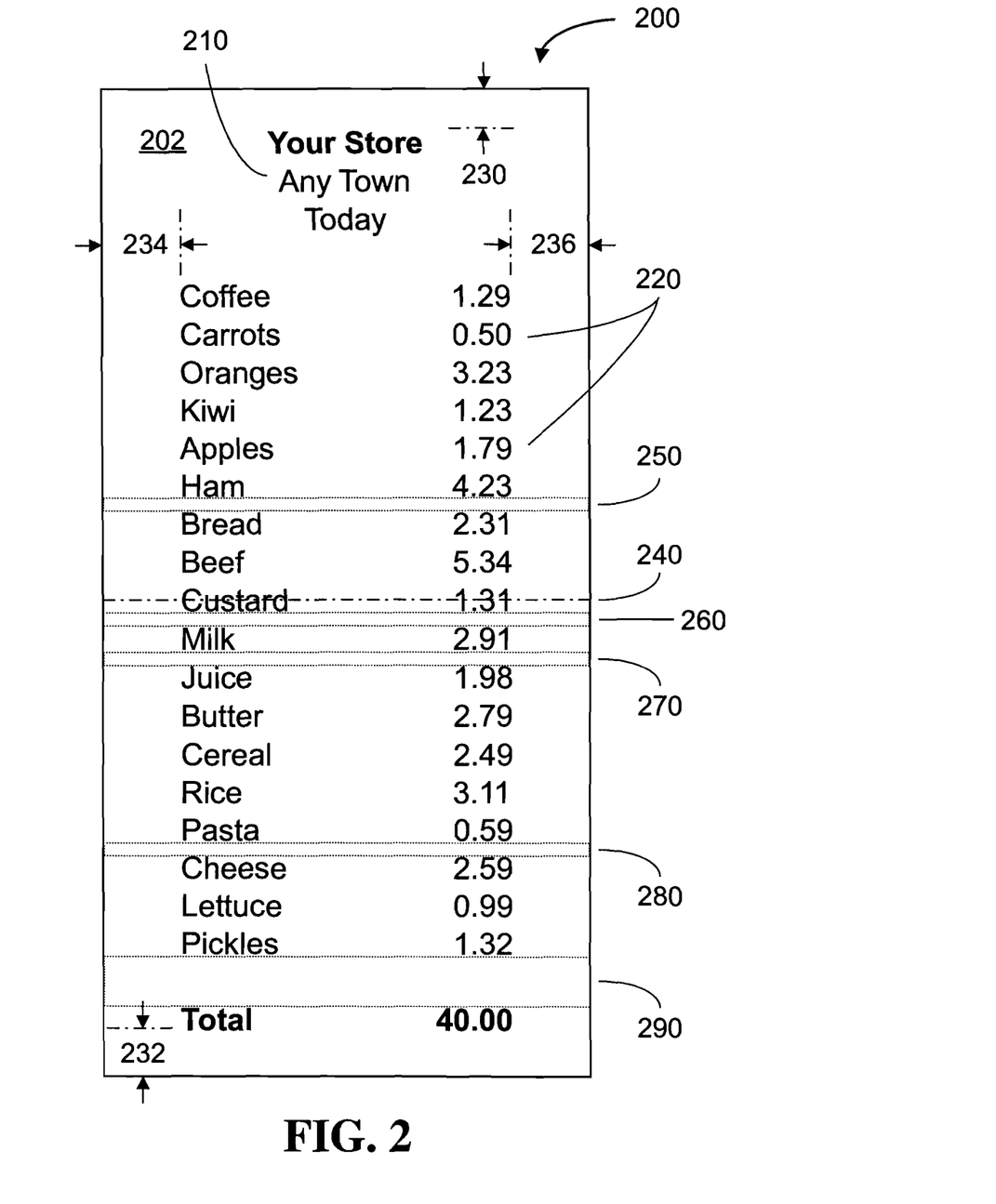
FIG. 2 illustrates a single-sided receipt comprising header and transaction information printed on a first side thereof.

FIG. 2 shows print media 40 in the form of a receipt 200 having header 210 and transaction 220 information printed on a first (single) side 202 thereof by a printer such as the two-sided printer 10 of FIG. 1. The receipt 200 of FIG. 2 further comprises a top margin 230, a bottom margin 232, a left margin 234, and a right margin 236. In alternate embodiments, a document such as a receipt 200 may further comprise footer information (not shown) and/or additional transaction and/or graphic information (not shown), including, without limitation, one or more of a logo, a coupon, an advertisement, a rebate, a warranty, contest and/or legal information, and the like.

In operation, a two-sided printer 10 generating a receipt 200 may receive data representative of the header 210 and/or transaction 220 information from, for example, an application program running on an associated host computer or terminal (not shown). Such header and/or transaction data may be provided to the printer 10 in text (e.g., character) and/or graphic (e.g., raster, bitmap, and/or vector, etc) form. Additionally or alternately, some of all of the data representing the header 210, transaction 220, footer (not shown), and/or other provided text and/or graphic information (e.g., logos, coupons, advertisements, etc) may be retrieved from one or more memory or buffer elements 80 associated with the printer 10 for printing in concert with, or separately from, any externally received data.

Regardless of from where or in what form the data is obtained, it may be desirable to avoid splitting print data within the bound of one or more contiguous text and/or graphic elements represented by such data. For example, in one embodiment, it may desirable to split print data, such as data representative of the header 210 and transaction 220 information shown on the first side 202 of the receipt 200 of FIG. 2, such that approximately one half of the resultant text and/or graphic information represented by such data is printed on a first side of two-sided media 40 and the remaining approximately one half of the resultant text and/or graphic information is printed on a second side of the two-sided media 40. In FIG. 2, such a uniform split location is represented by the dot-dash midpoint line 240.

With reference to FIG. 2, it can be seen that a uniform or other split of print data underlying a printed document, such as splitting of the data underlying the receipt 200 at a location represented by the dot-dash midpoint line 240, may result in a first portion of a contiguous character line or graphic image, such as the top portion of the Custard purchase line item, being undesirably printed on, for example, a first side of two-sided media 40, and a second portion of the contiguous print line or image, such as the bottom portion of the Custard purchase line item, being undesirably printing on, for example, a second side of the two-sided media 40.

One solution the above described undesirable split, is to split print data pursuant to a received carriage return or other end-of-line indication, which solution is well suited to situations where data is provided in text (e.g., character) form. However, as described hereinabove, a further solution comprising splitting print data at or within one or more clear and/or semi-clear regions (e.g., regions containing minimal to no data for printing) is well suited to situations where data is provided in graphic (e.g., raster, bitmap, and/or vector) as well as text (e.g., character) form to avoid improperly or imprudently separating the resultant, printed information.

In one embodiment, where it is desired to split print data such that roughly equal portions of the information represented by such data is printed on a first and a second side of two-sided media 40 by, for example, first and second print heads 20, 30 of a two-sided printer 10, such data may be split at or in a location representative of a clear region, such as the region 260 of the receipt 200 of FIG. 2, proximate to an identified midpoint 240 rather than at the midpoint 240 itself, thereby maintaining the integrity of the resultant print information 210, 220.

Figure 3A:
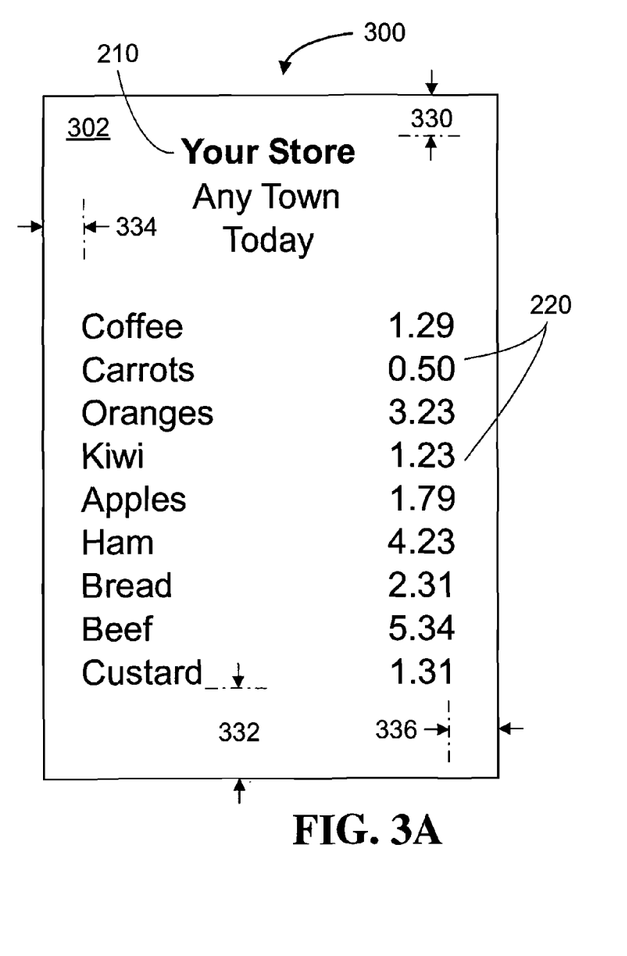
FIG. 3A illustrates a two-sided receipt comprising the header and a first portion of the transaction information from the single-sided receipt of FIG. 2 printed on a first side thereof.
Figure 3B:
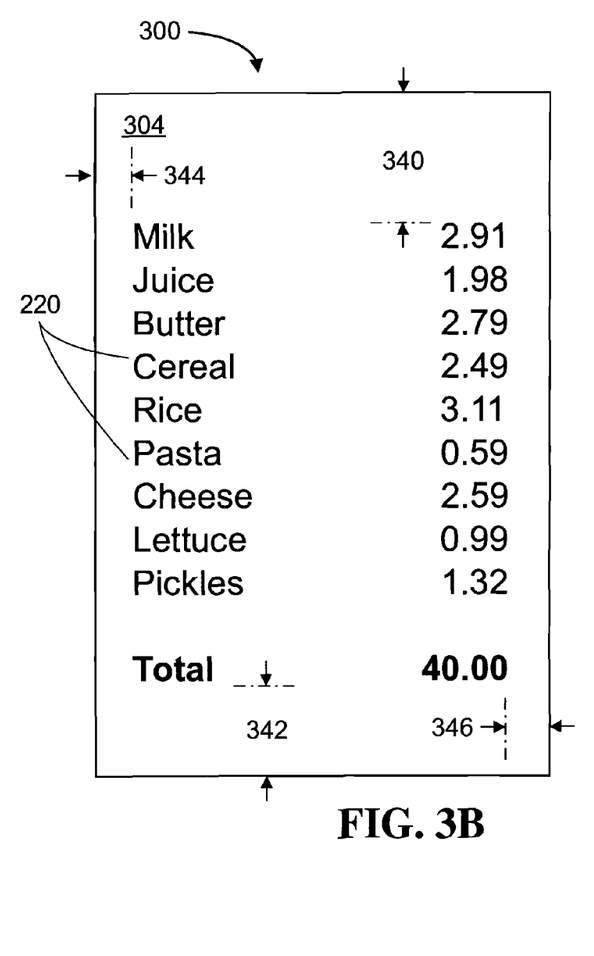
FIG. 3B illustrates the two-sided receipt of FIG. 3A comprising a second portion of the transaction information from the single-sided receipt of FIG. 2 printed on a second side thereof.

FIGS. 3A and 3B show respective first and second sides 302, 304 of a two-sided receipt 300 comprising the header 210 and transaction 220 information from the receipt 200 split along a respective top and bottom portion of the clear region 260 immediately following the midpoint line 240 of FIG. 2. As shown in FIG. 3A, the illustrated two-sided receipt 300 comprises header information 210 along with a first portion of the transaction information 220 from the receipt 200 of FIG. 2 printed on a first side 302 thereof by a printer such as the two-sided printer 10 of FIG. 1. Likewise, as shown in FIG. 3B, the illustrated two-sided receipt 300 further comprises a second portion of the transaction information 220 from the receipt 200 of FIG. 2 printed on a second side 304 thereof. Such a split of the print data representative of the information printed on the first side of the receipt 200 of FIG. 2 may be effected by scanning the data for a clear region 260 following a point in the data representative of a desired split location, such as a physical midpoint 240 of printed header 210 and transaction 220 information shown on the first side 202 of the receipt 200 of FIG. 2.

Additionally, the first side 302 of the receipt 300 illustrated in FIG. 3A further comprises a top margin 330, a bottom margin 332, a left margin 334, and a right margin 336, some or all of which may be the same size as, or independently sized in regard to, the respective margins 230, 232, 234, 236 provided on the single-sided receipt 200 shown in FIG. 2. Likewise, the second side 304 of the receipt 300 illustrated in FIG. 3B further comprises a top margin 340, a bottom margin 342, a left margin 344, and a right margin 346, some or all of which may also be the same size as, or independently sized in regard to the respective margins 230, 232, 234, 236 provided on the single-sided receipt 200 shown in FIG. 2, as well as the respective margins 330, 332, 334, 336 provided on the first side 302 of the two-sided receipt 300 illustrated in FIG. 3A. It should be noted that one or both of the top 330, 340 and bottom 332, 342 margins of the respective first 302 and/or second sides 304 of the receipt 300 of FIGS. 3A and 3B may vary according with the identified split location 260.

In addition to a uniform or semi-uniform split, in some embodiments it may be desired or required to split data representative of some or all of the information to be printed on two-sided media 40 in a non-uniform manner. Such embodiments may be useful to avoid the actual or attempted printing of information in regions of the media 40 where it is not desired or possible to print, such as, for example, one or more regions containing preprinted information, lacking a required surface preparation or coating, such as one or more thermal dyes, and the like. Likewise, a non-uniform split of print data, such as data representative of the header 210 and/or transaction 220 information of FIG. 2, may also be desired or required to, for example, accommodate printing of additional, predefined information, such as one or more of a logo, a coupon, a rebate, a warranty, contest information, and the like, on one or both sides of two-sided media 40 along with the header 210 and transaction 220 information.

Figure 4A:
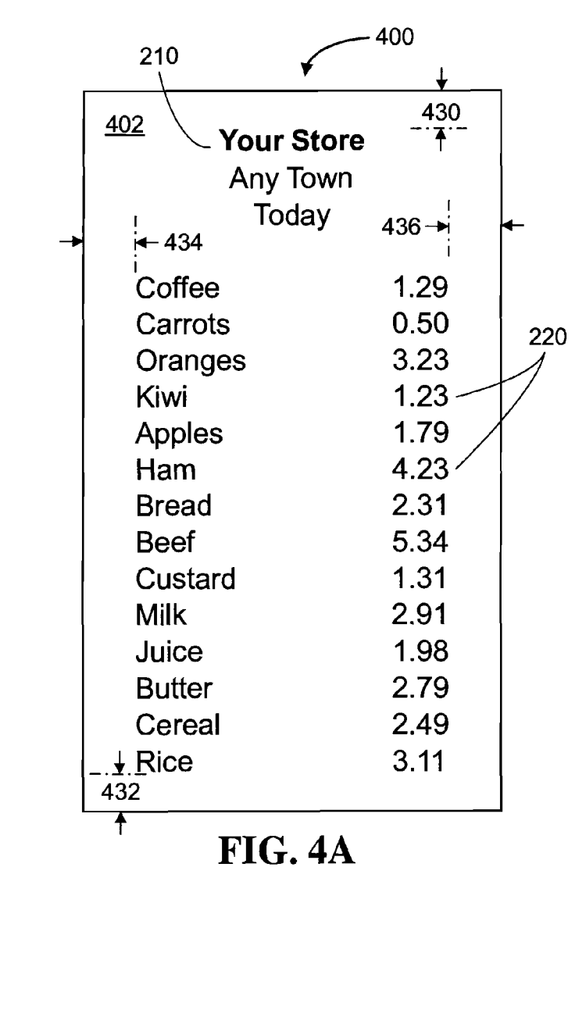
FIG. 4A illustrates a two-sided receipt comprising the header and a first portion of the transaction information from the single-sided receipt of FIG. 2 printed on a first side thereof.
Figure 4B:
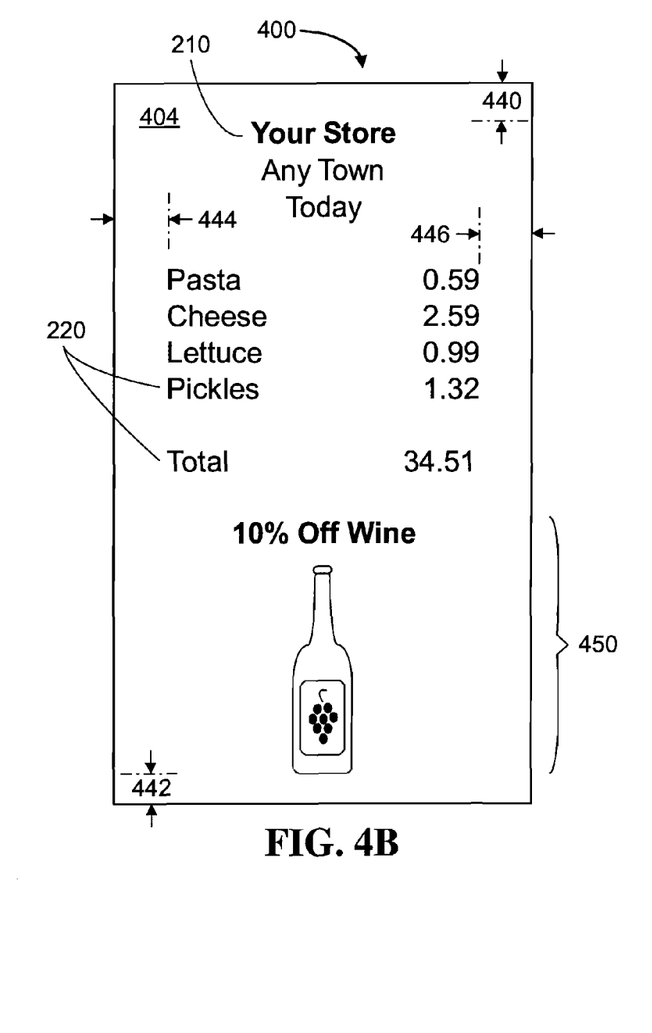
FIG. 4B illustrates the two-sided receipt of FIG. 4A comprising a second portion of the transaction information from the single-sided receipt of FIG. 2 printed on a second side thereof along with duplicate header and additional (coupon) information.

In one such embodiment, illustrated with respect to FIGS. 4A and 4B, it may be desired to split data representative of the header 210 and transaction 220 information shown in FIG. 2 in a non-uniform manner to accommodate the printing of additional, predefined information, such as a coupon 450 and an additional instance of a header 210, on a second side 404 of a two-sided receipt 400. In such instance, data underlying the transaction information 220 of FIG. 2 may be non-uniformly split at, for example, a location corresponding to the region 280 between Pasta and Cheese purchase lines item of FIG. 2. In this manner, additional space required to print the header 210 and coupon 450 information on the second side 404 of the receipt 400 is preserved. Depending on the embodiment data representative of the coupon 450 and/or additional header 210 information may be retrieved from one or more memories 80 of the printer 10, or received with the original header 210 and/or transaction 220 information from one or more computers associated with the printer 10, such as a POS terminal (not shown), through an associated communication controller 70.

It should be noted that a split of print data may comprise a split of some or all of the data representative of information desired to be printed on one or both sides of two-sided media including, without limitation, some or all of the data representative of the header 210 and transaction 220 information illustrated on the receipt 200 of FIG. 2, as well as any additional information desired or required to be printed on one or both sides of a document such as, but not limited to, one or more of a logo, a serialized cartoon, a condition of sale, a graphic or other image, an advertisement, a security feature, rebate or contest information, ticket information, legal information such as a disclaimer or a warranty, and the like. Further when it is desired or required to split less than all of the data representative of to-be-printed information, a portion of the data not identified for splitting may be factored into the process of identifying an acceptable split location for the portion of the data identified for splitting, such as factoring in data representative of the coupon information 450 of FIG. 4B in determining where to split the transaction information 220 from FIG. 2 for printing on a first and a second side of a two-sided receipt 400 as described above.

Likewise, a decision to split data may factor in regions on one or both sides of media 40 where printing is not possible or desired. For example, in a further embodiment, one or both of the header 210 and/or coupon 450 information of the receipt 400 of FIGS. 4A and 4B may be preprinted on one or both sides 402, 404 thereof. Additionally or alternatively, a split of print data may take into consideration the relative and/or absolute size of desired or required top 430, 440, bottom 432, 442, left 434, 444 and/or right 436, 446 margins of respective first and/or second sides of two-sided media 40, such as the two-sided media comprising the receipt 400 of FIGS. 4A and 4B, as well as a size of the media itself (e.g., length, width, etc) in making a split location determination.

Figure 5:
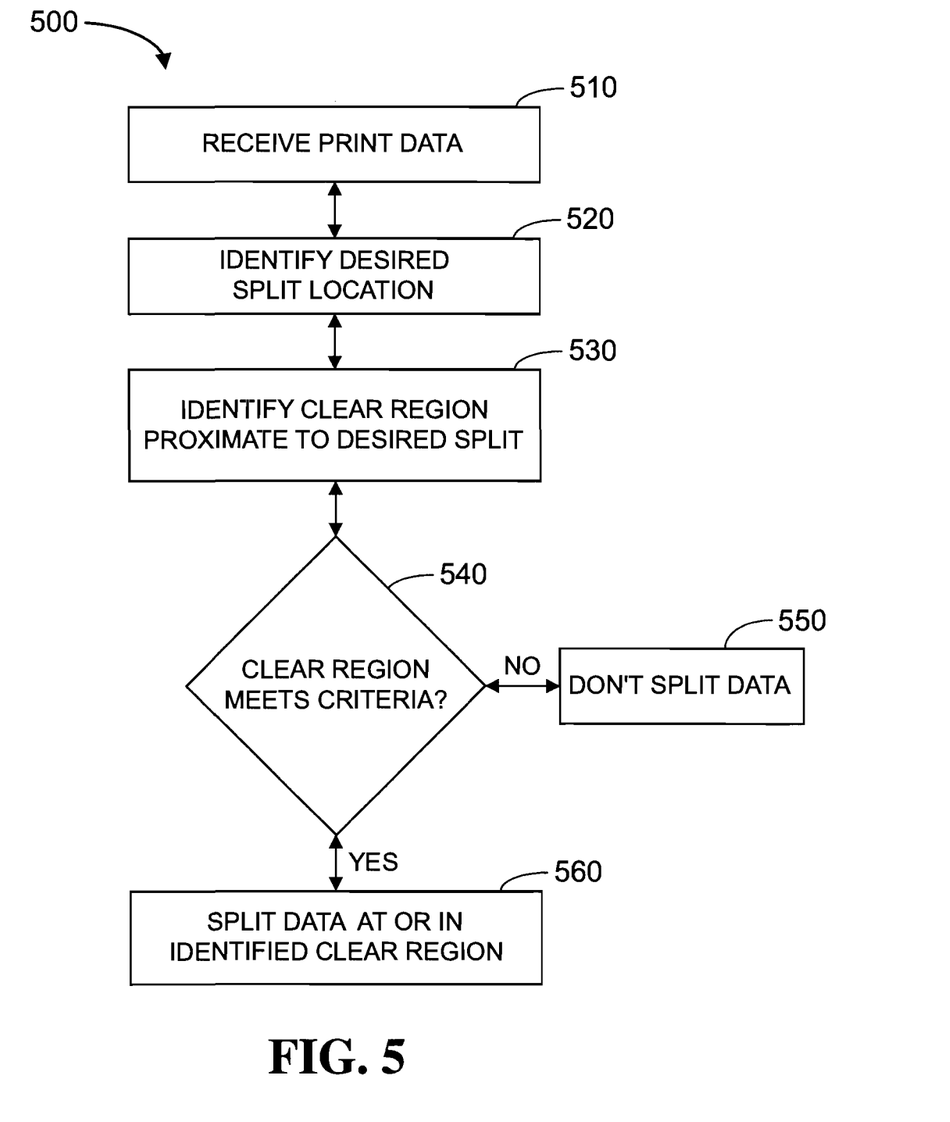
FIG. 5 illustrates a first method of splitting data for printing by a two-sided direct thermal printer.

FIG. 5 illustrates a first method 500 of splitting print data for printing on, for example, a first and a second side of two-sided media 40 by a two-sided printer such as the printer 10 of FIG. 1. Depending on the embodiment, some or all of the method of FIG. 5 may be implemented by an application program and/or a print driver executing on a host computer such as a POS terminal associated with the printer 10, and/or by firmware and/or software executed by, for example, a processor 90 and/or a printing function switch 100 associated with the printer 10 of FIG. 1.

Initially, at step 510 of the method 500 of FIG. 5, print data is received for printing. Where the method 500 is performed by an application program, such data may be generated by and therefor be directly available to such program for splitting. Where the method 500 of FIG. 5 is performed by a print driver executing on a host computer associated with the two-sided printer 10, such data may be provided to the driver by an application program generating the data. Finally, where the method 500 of FIG. 5 is implemented by a printer, print data may be received from an application program and/or a print driver executing on a host computer, such as a POS terminal, via a communication interface associated with such printer, such as the communication controller 70 of the two-sided printer 10 of FIG. 1.

Regardless of where the method 500 is implemented, a desired or required split location may be identified in the received print data at step 520. In one embodiment, a desired or required split location may comprise a location in the print data corresponding to a midpoint of the print information represented by the data transverse to the print direction, such as a location corresponding to the midpoint 240 of the header 210 and transaction 220 information printed on the first side 202 of the single-sided receipt 200 of FIG. 2. Such a desired or required split location may result from a desire or requirement to provide substantially the same amount of printed information on a first and a second side of a two-sided document, such as first side 302 and second side 304 of a two-sided receipt 300 as shown in FIGS. 3A and 3B, in order to minimize media usage.

In other embodiments, identifying a desired or required split location may comprise identifying a first portion of print data for printing on a first side of media 40 and a second portion of print data for printing on a second side of the media 40, wherein the portion of the media 40 to be occupied by information represented by the first data portion is different from the portion of the media 40 to be occupied by information represented by the second data portion. A difference in the respective portions of the media 40 to be occupied by information represented by the first and second data portions may comprise, interalia, a portion of the first and/or second sides of the media 40 comprising preprinted information, lacking one or more required print properties and/or characteristics such as one or more required thermal coatings, and/or an amount of a first and/or a second side of the media 40 required to be reserved for printing of additional, predefined information such as the coupon information 450 of FIG. 4B. Variations are possible.

Once a desired split location is identified, the data may, at step 530, be scanned to identify one or more portions of the data representing one or more clear or semi-clear regions (e.g., a region containing an acceptable, minimum amount of data for printing) in or between discrete print elements at or in which regions it may be permissible to split the data for printing. Where print data is provided in the form of lines of text or other character data, a suitable clear or semi-clear region for splitting of the print data may be found by scanning such data for, for example, one or more carriage returns or other end-of-line commands denoting a break in the final printed information. Where print data is provided in the form of graphic (e.g., raster, bitmap, vector, etc) data, a suitable clear or semi-clear region for splitting of the print data may be found by scanning such data for, for example, portions of the data representing one or more regions in or between discrete graphic elements and transverse to the print direction containing no to an acceptable, minimum amount of data for printing.

Portions or blocks of print data in or at which it may be acceptable to split the data for printing may correspond to, for example, the clear and/or semi-clear regions 250, 260, 270, 280, 290 between purchase line items of the transaction information 220 printed on the first side 202 of the receipt 200 of FIG. 2, or any other region or regions in the information represented by such data in or at which a suitable break may be found.

Once an appropriate clear or semi-clear region is identified, it may be compared, at step 540, to one or more predetermined criteria as a condition precedent to splitting the data at or in a portion of the data corresponding to such region. Such predetermined criteria may include, but are not limited to: (1) the identified data portion and/or corresponding print region being within a predetermined distance of a desired split location (e.g., bytes, character lines, dot rows, mm, inches, and the like), (2) the identified data portion and/or corresponding print region comprising a predetermined quantity or size (e.g., bytes, character lines, dot rows, mm, inches, square mm, square inches, and the like), (3) the print data, and/or the information corresponding to it, before and after an identified split location each comprising a predetermined quantity or size (e.g., bytes, character lines, dot rows, mm, inches, square mm, square inches, and the like), (4) the print data, and/or the information corresponding to it, before and after an identified split location differing in quantity or size by a predetermined amount (e.g., bytes, character lines, dot rows, mm, inches, square mm, square inches, and the like), and the like. It should be noted that, as appropriate, any of the above identified predetermined criteria may be represented as a predetermined percentage taken in relation to either a total print data or print information quantity, or relative to an individual print data or print information quantity (e.g., in relation to a portion of the data above and/or below a split location).

When the identified clear or semi-clear region meets the one or more predetermined criteria, the data may, at step 560, be split accordingly. However, when the identified clear or semi-clear region does not meet the one or more predetermined criteria, the data may, at step 550, not be split. In one embodiment, a decision to split print data may comprise a decision to designate a first portion of the data for printing by a first print head 20 on a first side of two-sided media 40 and a second portion of the print data for printing by a second print head 30 on a second side of the media 40. Likewise, in one embodiment, a decision to not split print data may comprise a decision to designate all of the print data for printing by one of the first 20 or second 30 print heads on a respective first or second side of two-sided media 40 (e.g., a decision for single-sided printing).

In other embodiments, if the data is not identified for splitting pursuant to a first identified clear or semi-clear region, a further, or second clear or semi-clear region may be identified and the process repeated until a decision to split is supported or no further, suitable, clear or semi-clear regions are found. Such a process may be illustrated with respect to FIG. 6.

Figure 6:
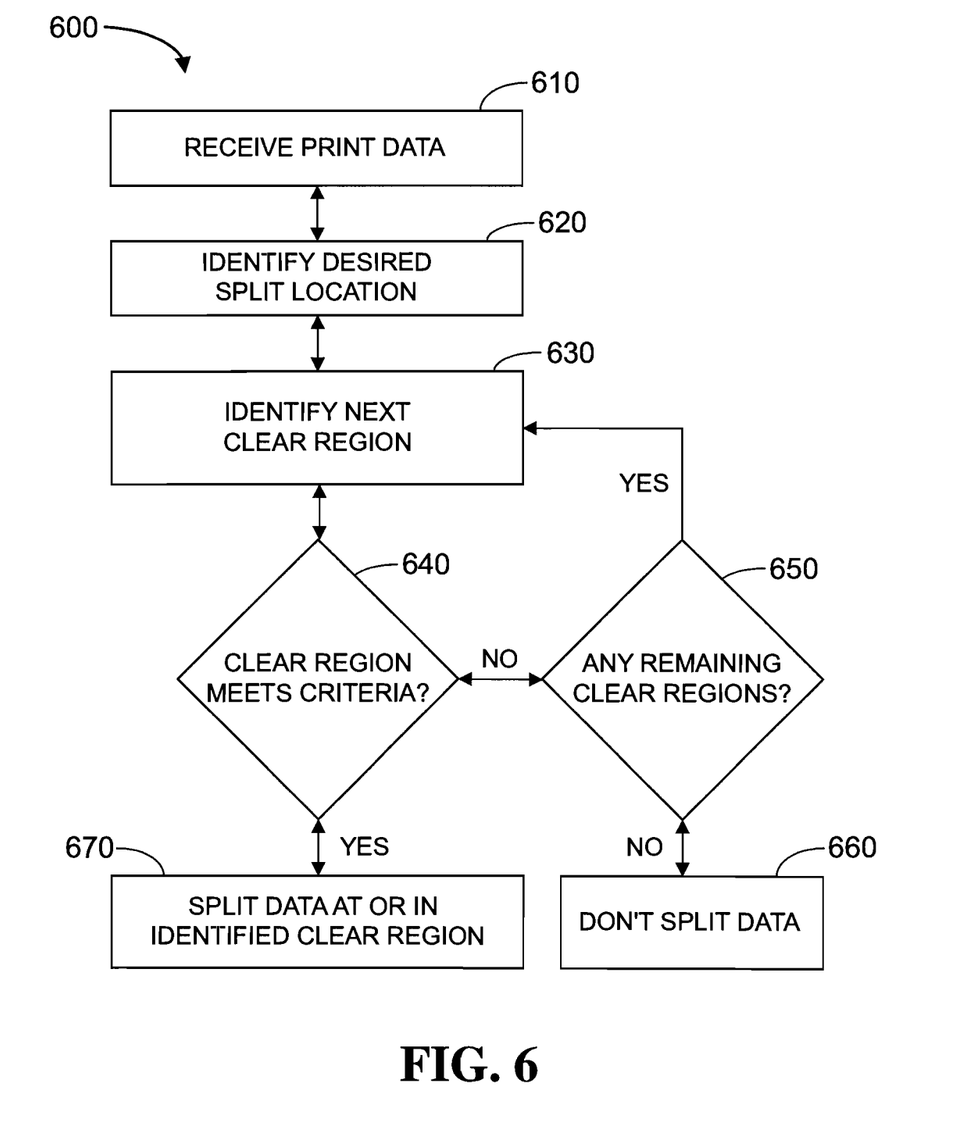
FIG. 6 illustrates a second method of splitting data for printing by a two-sided direct thermal printer.

FIG. 6 illustrates a second method 600 of splitting print data for printing on, for example, a first and a second side of two-sided media 40 by a two-sided printer such as the printer 10 of FIG. 1. Depending on the embodiment, some or all of the method 600 of FIG. 6 may be implemented by an application program and/or a print driver executing on a host computer, such as a POS terminal, associated with the printer 10, and/or by firmware and/or software executed by, for example, a processor 90 associated with the printer 10.

Initially, at step 610 of the method 600 of FIG. 6, data is received for printing. Where the method 600 is performed by an application program, such data may be generated by and therefor be directly available to such program. Where the method 600 is performed by a print driver, such data may be provided to the driver by an application program generating the data. Finally, where the method 600 is implemented by a printer, such as the printer 10 of FIG. 1, the print data may be received via a communication controller 70 associated with such printer.

At step 620 of the method 600 of FIG. 6 a required or desired split location may be identified in the received print data. In one embodiment, a required or desired split location may result from a desire or a requirement to effectuate a non-uniform split of print data. For example, a desired or required split location in print data may correspond to a line across the print information represented by such data transverse to a print direction such that the information to be printed prior to the desired split location will occupy a fixed amount (e.g., 6 mm) more media along the print direction than the information to be printed following the desired split location. Such a split location may be selected to accommodate, interalia, the existence of preprinted information on one or both sides of two-sided media 40, the absence of one or more required surface preparations, such as one or more thermal dyes, on one of both sides of two-sided media 40, and/or a desire or requirement to print additional, predefined information on one or both sides of two-sided media 40, such as the coupon information 450 shown on the second side 404 of the receipt 400 of FIG. 4.

Once a desired or required split location is identified, a next clear or semi-clear region may be identified at step 630. Identifying such next clear or semi-clear region may comprise sequentially scanning print data for a portion of the data corresponding to, for example, one of the regions 250, 260, 270, 280, 290 between the individual purchase line items of the transaction information 220 printed on the first side 202 of the receipt 200 of FIG. 2, or any other region or area of as-printed information represented by such data in or at which a suitable break in the text and/or graphic information may be found.

Once a next clear or semi-clear region is identified, it may be compared, at step 640, to one or more predetermined criteria as a condition precedent to splitting the data at or in a portion of the data corresponding to such region. As for the method 500 of FIG. 5, such predetermined criteria may include, but are not limited to: (1) the identified data portion and/or corresponding print region being within a predetermined distance of a desired split location (e.g., bytes, character lines, dot rows, mm, inches, and the like), (2) the identified data portion and/or corresponding print region comprising a predetermined quantity or size (e.g., bytes, character lines, dot rows, mm, inches, square mm, square inches, and the like), (3) the print data, and/or the information corresponding to it, before and after an identified split location each comprising a predetermined quantity or size (e.g., bytes, character lines, dot rows, mm, inches, square mm, square inches, and the like), (4) the print data, and/or the information corresponding to it, before and after an identified split location differing in quantity or size by a predetermined amount (e.g., bytes, character lines, dot rows, mm, inches, square mm, square inches, and the like), any of the above taken as a percentage of the total print data or information represented thereby, and the like.

When the next identified clear or semi-clear region meets the one or more predetermined criteria, the data may, at step 670, be split thereat or therein. When, however, the next identified clear or semi-clear region does not meet the one or more predetermined criteria, it may, at step 650, be determined whether one or more additional clear or semi-clear regions exist in the data for splitting. Such additional clear or semi-clear regions may be identified through a contemporaneous scan of at least a portion of the print data, or pursuant to the results of a prior scan of all the print data, and the like.

When one or more additional clear or semi-clear regions are found to exist, a next one of the remaining regions may, at step 630, be selected for evaluation against the one or more predetermined criteria at step 640, and the process continued as described above until a clear or semi-clear region is found to meet the one or more predetermined criteria and accordingly split for printing at step 670, or no remaining regions are found and the data is, at step 660, not split for printing.

As described above with regard to the method 500 of FIG. 5, where a decision to split print data is made such decision may, in one embodiment, result in the print data being split such that data corresponding to information to be printed before the acceptable clear or semi-clear region is designated for printing by a first print head 20 of a two-sided printer 10 and data corresponding to information to be printed after the acceptable clear or semi-clear region is designated for printing by a second print head 30 of a two-sided printer 10. Likewise, in one embodiment, a decision to not split print data may result in all of the print data being designated for printing by only one of the first 20 and second 30 print heads of a two-sided printer 10 (e.g., the decision may represent a decision for single-sided printing of the print data).

A scan of print data for portions or blocks thereof representative of a clear or semi-clear region in the final print information proximate to a desired split location at or in which the print data may be split, may be performed by scanning the print data beginning at a point representative of the desired split location and progressing in a direction in which the information represented by such data will be printed toward an end of such data. As described above in regard to FIGS. 5 and 6, a subsequently identified, candidate, clear or semi-clear region may, then, be analyzed to determine if it meets one or more predefined criteria. If so, the data may be split at a location corresponding to the identified clear or semi-clear region. If not, the data may be iteratively scanned for a portion of the data representative of a further clear or semi-clear region starting at a point in the data corresponding to the prior, failed region, and progressing in a direction in which the information represented by such data will be printed toward an end of such data until a suitable region (if any) is found.

In an alternate embodiment, print data may be iteratively scanned for a portion of the data representative of a clear or semi-clear region proximate to a desired split location starting at a point in the data corresponding to the desired split location and/or a prior, failed region, and progressing in a direction counter to the direction in which the information represented by such data will be printed (e.g., from the midpoint line 240 to the top of the header 210 as illustrated in regard to the receipt of FIG. 2).

In other embodiments, scanning of print data to identify one or more clear or semi-clear print regions represented by such data proximate to a desired split location may comprise scanning the print data to identify all clear or semi-clear regions in the data, and subsequently scanning the identified regions for one or more regions proximate to the desired split location. In one embodiment, scanning of the identified regions may comprise sorting the identified regions according to their proximity to the desired split location. Such as sort may employ a least squares, absolute value or other, normalizing methodology. Once candidate clear or semi-clear regions have been identified and sorted by proximity, they may then be analyzed in order of distance from the desired split location to determine if any meet one or more predetermined criteria in order to identify a suitable region for splitting of the data.

Alternate methods, such as scanning the data for one or more candidate clear or semi-clear regions and concurrently analyzing any such identified region for conformance with one or more predetermined criteria, are also possible. In such case, identified regions meeting the one or more predetermined criteria may be sorted for proximity to a desired split location and the nearest selected for splitting of the data. Alternately, the first identified region meeting the one or more predetermined criteria may be selected for splitting of the data, which method may be particularly desirable when one of the predetermined criteria comprises an identified clear or semi-clear region being within a predetermined distance from a desired split location.

Combinations of and/or variations on the above describes scanning methodologies are also possible.

Where print data is provided in the form of a bitmap, one or more clear or semi-clear regions may be identified in such data by scanning the bitmap for one or more clear or semi-clear dot lines, or regions thereof, at or in which the data may be split for printing.

Figure 7:
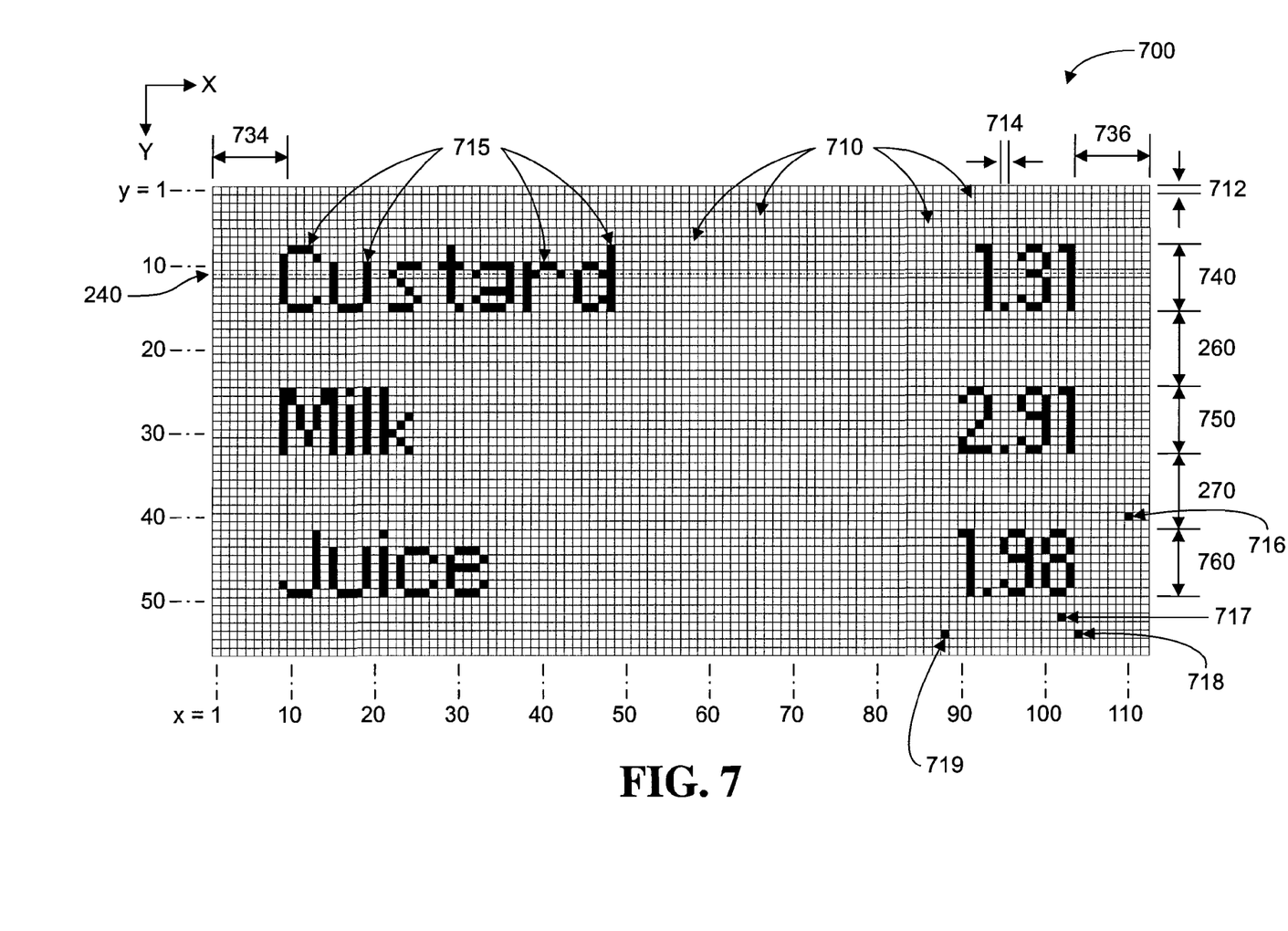
FIG. 7 illustrates a bitmap representing a portion of the transaction information from the single-sided receipt of FIG. 2.

FIG. 7 illustrates a bitmap 700 representing a portion of the transaction information 220 of the receipt 200 of FIG. 2 about the identified dot-dash midpoint line 240. Note, the orthogonal (x-y) grid lines of FIG. 7 are shown for reference only and are not part of the bitmap 700.

The bitmap 700 of FIG. 7 comprises a matrix of individual dots 710, 715, 716, 717, 718, 719 comprising 112 dot columns (e.g., x=1 to 112) and 56 dot lines or rows (e.g., y=1 to 56). Each individual dot may further be characterized by a particular dot height 712 and dot width 714 measured in mm, inches, pixels and the like.

Depending on the application, data underlying a bitmap, such as the bitmap 700 of FIG. 7, may comprise single (e.g., black) or multi (e.g., CMYK) color image data for printing by a single or multi-color printer 10 on respective single or multi-color media 40. In one embodiment, the data underlying a bitmap, such as the bitmap 700 of FIG. 7, comprises a binary matrix of zeros and ones, wherein each zero corresponds to a blank (e.g., un-imaged) dot of the bitmap, such as any of the blank dots 710 of the bitmap 700 of FIG. 7, and each one corresponds to a black (e.g., imaged) dot of the bitmap, such as any of the black dots 715, 716, 717, 718 and 719 of the bitmap 700 of FIG. 7.

In an embodiment, individual dot rows comprising a bitmap, such as the bitmap 700 of FIG. 7, may be printed on respective sides of two-sided thermal media 40 using first 20 and second 30 thermal print heads, wherein each of the print heads 20, 30 spans a width of the media 40 on a respective first and second side, or at least a printable portion (e.g., excluding unprinted margin or border areas) thereof. In further embodiments, each the first and the second thermal print heads 20, 30 may comprise a series of individual print elements, wherein each print element corresponds to an individual dot of a given dot row of the bitmap.

As previously discussed hereinabove, in determining where to split print data for, for example, two-sided printing, it may be desirable to avoid splitting such data in the middle of one or more contiguous character (e.g., text) and/or graphic print elements. For example, with reference to FIG. 7, it may be desirable to avoid splitting the data underlying the bitmap 700 in regions representative of one or more transaction entries, such as the entries for the purchase of Custard, Milk, and Juice contained in the regions 740, 750, 760 of FIG. 7 comprising the dot rows from y=8 to 15, 25 to 32, and 42 to 49, respectively. By corollary it may, therefore, be desirable to split the data underlying the bitmap 700 in regions representative of the space between the one or more transaction entries, such as the regions 260, 270 of FIG. 7 comprising the dot rows from y=16 to 24 and 33 to 41.

It should be noted that while the number of dot rows contained in each of the regions 740, 750, 760 comprising the transaction entries, and the number of dots rows contained in each of the regions 260, 270 comprising the space between transaction entries of the bitmap 700 of FIG. 7 are the same for each type of region (e.g., transaction entry v. space there between), the number of dot rows comprising any of the printed 740, 750, 760 and non-printed 260, 270 regions may, in practice, vary.

When splitting data underlying a bitmap, such as the bitmap 700 of FIG. 7, it may be possible to avoid an undesired split of such data by scanning the data to identify one or more dot rows, or portions thereof, meeting one or more predetermined criteria, at or between which the data may be split. For example, in the case of data representing the bitmap 700 of FIG. 7, a scan may start at a point in the data corresponding to a desired split location, such as at the start of the dot row at y=11 corresponding to the dot-dash midpoint line 240, and proceed sequentially in a positive y direction through the data representative of the dot rows at y=12, 13, 14, and 15 until data representative of a clear or semi-clear dot row, such as any of the dot rows from y=16 to 24, or a suitable, contiguous group thereof, is identified.

In scanning the data underlying a bitmap, each of the dot rows represented thereby may be analyzed to assess if they individually, or in concert with one or more additional, adjacent dot rows, meet one or more predetermined criteria as a condition precedent to splitting the data at any of the rows, or within any region defined by one or more contiguous groups thereof. In the first instance, one or more of the predetermined criteria assist in assessing whether a given dot row comprises a clear or semi-clear dot row at or in which it may, alone or in combination with other clear or semi-clear dot rows, be permissive to split the print data.

In some embodiments, data underlying a given bitmap dot row may be constrained such that no more than a predetermined number of dots (e.g., 0, 1, 2, 3, etc) are identified for printing in the given row before the data may be split at or within such row. For example, in reference to the bitmap 700 of FIG. 7, where no dots are permitted to be identified for printing in a given dot row, the data underlying the bitmap 700 may be split at or in any of the dot rows other than those at y=8 to 15, 25 to 32 and 42 to 49 representing the purchase line item entries for Custard, Milk and Juice, respectively, as well as any of the rows at y=40, 52 and 54 which are, for this example, shown to comprise one or more stray dots identified for printing. Likewise, where no more than one dot is allowed to be identified for printing in a given dot row, the rows at y=1 to 7, 16 to 24, 33 to 41, 50 to 53, and 55 to 56 would be allowed to be included in a block of permitted rows for splitting of the data underlying the bitmap 700 of FIG. 7 while the rows at y=8 to 15, 25 to 32, 42 to 49 and 54 would not.

In other embodiments, the data underlying a given dot row may be constrained such that any dots identified for printing in a given row, up to a permissible number as described above, are non-adjacent, or are otherwise required to be separated by a minimum number of blank dots (e.g., 10, 20, 30, etc), prior to including such dot row in a count of permitted rows for splitting of the print data underlying the bitmap 700. Depending on the embodiment, the number of dots allowed to be identified for printing in a given row may vary with the spacing between the dots, and vice versa.

In still further embodiments, data underlying a given dot row may be constrained such that less than or equal to a minimum percentage (e.g., 1%, 2%, 3%, etc) of the dots comprising the given row, or relevant portion thereof, are identified for printing (e.g., will print as black), or greater than or equal to a minimum percentage (e.g., 99%, 98%, 97%, etc) of the dots comprising the given row, or relevant portion thereof, are not identified for printing (e.g., will print as blank), prior to including that row in a count of permitted rows for splitting of print data. For example, a predetermined criteria may specify that fewer than one percent (1%) of the dots in a given dot row be identified for printing prior to including such row in a count of permissive dot rows for data splitting purposes. In such case, data underlying the dot rows at y=23 and 52 of the bitmap 700 of FIG. 7, which dot rows contain >99% (e.g., 111 of 112) blank dots, would meet such criteria while the data underlying the dot row at y=54, which row contains <99% (e.g., 110 of 112) blank dots, as well as nay of the dot rows at y=8 to 15, 25 to 32 and 42 to 49 representing line items for the purchase of Custard, Milk and Juice, respectively, would not meet such criteria.

In additional embodiments, data underlying a candidate dot row may be limited such that no adjacent dot rows, or no more than a predetermined number of adjacent dot rows, include one or more dots designated for printing. Likewise, in still further embodiments a dot row including one or more dots designated for printing may only be included in a count of permitted rows for splitting of the data where such dots are to be printed in one or more target areas of a final, printed document, such as the single printed dot 716 of the dot row at y=40 of the bitmap 700 of FIG. 7 which is indicated for printing in a right margin area 736.

In addition to placing constraints on data underlying a given dot row, one or more predetermined criteria may place constraints on groups of adjacent dot rows comprising a clear or semi-clear region in or at which print data may be split. For example, in one embodiment, a predetermined number (e.g., nominally 4 to 16; preferably 8 to 10) of contiguous clear or semi-clear dot rows (e.g., dot rows meeting one or more predefined criteria regarding the number and location of dots designated for printing therein) comprising a contiguous region of dot rows, such as the region 260 of dot rows from y=16 to 24 between the line item entries for Custard and Milk in the bitmap 700 of FIG. 7, may be required to be found prior to allowing the underlying print data to be split there at or in. Likewise, in other embodiments, a contiguous number of clear or semi-clear dot rows may be required to represent a minimum, as-printed physical area or space (e.g., nominally 0.5 to 2 mm of media length; preferably 1 to 1.25 mm), and the like, prior to a split being permitted there at or in. It should be noted that any such predetermined criteria may vary with, inter alia, one or more printer design or operating attributes such as, but not limited to, print resolution (e.g., vertical and/or horizontal dots per inch) wherein, for example, a required, predetermined number of dot rows and/or the physical area/space represented thereby may increase with decreased printer resolution, and vice versa.

Variations in and/or combinations of any of the above bases for identifying permissible rows for splitting of print data for, for example, printing on a first and a second side of two-sided media 40 by a two-sided printer 10, are also possible.

In attempting to identify one or more permissible regions for splitting of print data representative of a bitmap, such as the bitmap 700 of FIG. 7, a scan may, as disclosed above, begin at a dot row corresponding to a desired split location, such as the dot row at y=11 corresponding to the midpoint line 240 of FIG. 7, and proceed in a downward (e.g., positive y) or an upward (e.g., negative y) direction. In alternate embodiments, a scan of print data representative of a bitmap, such as the bitmap 700 of FIG. 7, may start at a data location corresponding to a first dot of a first dot row, such as the dot at x=1 of the dot row at y=1 of the bitmap 700 of FIG. 7, and progressing through the data, dot row by dot row, to a last dot of a last dot row, such as the dot at x=112 of the dot row at y=56 of the bitmap 700 of FIG. 7, until one or more of the scanned dot rows meet one or more predetermined criteria.

In other embodiments, print data underlying a bitmap, such as the bitmap 700 of FIG. 7, may be scanned or otherwise traversed pursuant to a methodology used to store and retrieve the data for printing (e.g., first in, first out; first in, last out; etc). Likewise, in further embodiments, print data may be scanned or otherwise traversed to identify one or more permitted regions according to a physical or logical structure or address used to store the data, starting at, for example, a physical and/or logical data address representing the start of the print data and proceeding through a physical and/or logical data address representing the end of the print data, and the like.

Combinations of and/or variations on the above described methods for scanning of data representative of a bitmap, such as the bitmap 700 of FIG. 7, are possible.

As previously described, a method of splitting print data for, for example, printing on a first and a second side of two-sided media, may be performed by an application program generating the data, a print driver operating on the generated data, and/or a printer identified to print the data. In the case of a split of print data occurring at the application program level, generated print data may be split for printing on, for example, a first and a second side of two-sided media, in response to an internally generated and/or externally received command to print the generated data. For example, in one embodiment print data in the form of retail transaction information may be generated and split for printing by a retail application program executing on a host POS terminal for printing on a first and a second side of two-sided thermal receipt media by a two-sided thermal receipt printer in response to receipt of an end-of-transaction command entered by an operator of the POS terminal. Variations are possible.

In alternate embodiments, a method of splitting data for printing on, for example, a first and a second side of two-sided media 40, such as a two-sided thermal receipt, may be performed by, or through use of, one or more print drivers executed on a host computer, such as a POS terminal, associated with a two-sided printer 10, such as a two-sided thermal receipt printer. In operation, a print driver may intercept print data transmitted from a print spooler executing on a POS terminal prior to its transmission to an associated two-sided thermal printer for printing. Depending on the application, driver, and/or printer requirements, such data may be provided to the print driver in the form of one or more pages of print data, which pages may be individually or collectively split for printing on a first and/or a second side of two-sided media. As received print data is split by the print driver, it may be further spooled for later transmission and/or directly transmitted to a printer for printing.

In one embodiment, received print data may be split by an application program and/or a print driver executing on a host computer into a first data portion for, for example, printing by a first print head 20 on a first side of print media 40 by a two-sided printer 10, and a second data portion for, for example, printing by a second print head 30 on a second side of the print media 40 by the two-sided printer 10. Once split, the first data portion may be transmitted to the two-sided printer 10 along with an appropriate command indicating the first data portion is to be stored in a first print buffer or memory storage area 80 of the printer. Likewise, one split, the second data portion may be transmitted to the two-sided printer 10 along with an appropriate command indicating the second data portion is to be stored in a second print buffer or memory storage area 80 of the printer. Data from the first print buffer or memory storage area 80 may then be selected or otherwise identified for printing on a first side of print media 40 by the first print head 20 of the two-sided printer 10, while data from the second print buffer or memory storage area 80 may then be selected or otherwise identified for printing on a second side of the print media 40 by the second print head 30 of the two-sided printer 10, and vice-versa, through use of, for example, a printing function switch 100 of the two-sided printer 10. Variations are also possible.

In an alternate embodiment, received print data, including bitmap or other graphic data, may be split for printing on, for example, a first and a second side of two-sided media 40 by a printer, such as the two-sided printer 10 of FIG. 1. In such case, received graphic data, such as data representative of the bitmap 700 of FIG. 7, may be stored in one or more received data buffers or memory storage locations 80 of the printer 10. Subsequently, such data may then be retrieved from the print memory or buffer 80 and processed by the processor 90 to identify one or more appropriate split locations pursuant to, for example, the methods of FIGS. 5 and 6. Once an appropriate split location is identified, data identified for printing on a first side of print media 40 (e.g., data prior to and/or including an identified split location) may be stored in a first print buffer or memory storage location 80 for printing by a first print head 20, and data identified for printing on a second side of the print media 40 (e.g., data after and/or including an identified split location) may be stored in a second print buffer or memory storage location 80 for printing by a second print head 30. Variations, including identifying an acceptable split location, and alternately printing data prior to and following such split location on a first and a second side of two-side print media by first and second print heads 20, 30 associated with the printer 10 are also possible.

It should be noted that while the invention has been described with respect to splitting of data, and particularly graphic or bitmap data, into first and second potions for printing on respective first and second sides of two-sided media, the invention may also be applicable for splitting of data for printing on one or more pages of single-sided media, and/or combinations of the above, whether such media is provided in continuous roll, individual sheet and/or fan-folded form. For example, in one embodiment, the invention may be used to split print data, such as data representing the bitmap 700 of FIG. 7, into a first portion for printing on first side of a first piece of sheet media, and a second portion for printing on a first side of a second piece of sheet media. In a second embodiment, it may be desirable to split print data, such data representing the bitmap 700 of FIG. 7, into first, first and second data portions for printing on respective first and second sides of a first sheet of sheet media, and second, first and second data portions for printing on respective first and second sides of a second sheet of sheet media while ensuring that such split does not occur in the middle of a graphic and/or text print element. Variations, including combinations of the above are possible.

The above description is illustrative, and not restrictive. In particular, designation of a first and a second print head, platen, gear, and the like, as well as a first and second media sides, and the like, may vary among embodiments.

Further, many other embodiments will be apparent to those of skill in the art upon reviewing the above description. The scope of the embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. Likewise, various features are described only with respect to a single embodiment in order to avoid undue repetition. This method of disclosure is not to be interpreted as reflecting that the claimed embodiments should have more or less features than are expressly recited in each claim. Rather, as the following claims reflect, inventive subject matter lies in more or less than all features of a single disclosed embodiment. Thus the following claims are hereby incorporated into the description of the embodiments, with each claim standing on its own as a separate exemplary embodiment.

What is claimed is:

1. A method of splitting data comprising information for printing on a first and a second side of print media by respective first and second print heads of a two-sided printer, the method comprising:
   electronically by a computer or processor, identifying a portion of the data corresponding to a region of print media where none of the information is to be printed;
   electronically by a computer or processor, identifying as a first data portion a portion of the data before the portion of the data corresponding to a region of print media where none of the information is to be printed is identified;
   electronically by a computer or processor, identifying as a second data portion a portion of the data after the portion of the data corresponding to a region of print data where none of the information is to be printed has been identified;
   electronically by a computer or processor, designating the first data portion for printing by the first print head; and
   electronically by a computer or processor, designating the second data portion for printing by the second print head.

2. The method of claim 1 wherein electronically by a computer or processor, identifying a portion of the data corresponding to a region of print media where none of the information is to be printed comprises electronically by a computer or processor, identifying a portion of the data corresponding to a region of print media transverse to a print direction where none of the information is to be printed.

3. The method of claim 1, further comprising:
   electronically by a computer or processor, identifying a desired location for splitting the data,
   wherein electronically by a computer or processor, identifying a desired location comprises electronically by a computer or processor, identifying a location in the data meeting one or more predetermined criteria.

4. The method of claim 3, wherein at least one of the one or more predetermined criteria comprises a quantity of information represented by the first data portion being roughly equivalent to a quantity of information represented by the second data portion.

5. The method of claim 3, wherein electronically by a computer or processor, identifying a portion of the data corresponding to a region of print media where none of the information is to be printed comprises electronically by a computer or processor, identifying a portion of the data corresponding to a region of print media where none of the information is to be printed proximate to the desired location.

6. The method of claim 5, wherein the region of print media where none of the information is to be printed is within a predetermined distance of a region of print media corresponding to the desired location.

7. The method of claim 6, wherein the predetermined distance corresponds to a predetermined length of media along a media feed path.

8. The method of claim 6, wherein the data represents a bitmap comprising one or more dot rows, and the predetermined distance corresponds to a predetermined number of dot rows of the bitmap.

9. The method of claim 1, further comprising:
   electronically by a computer or processor, determining if the portion of the data corresponding to a region of print media where none of the information is to be printed meets one or more predetermined criteria; and
   electronically by a computer or processor, designating the first data portion for printing by the first print head and the second data portion for printing by the second print head when the one or more predetermined criteria are met.

10. The method of claim 9, wherein at least one of the one or more predetermined criteria require the region of print media where none of the information is to be printed to comprise a predetermined physical size.

11. The method of claim 10, wherein the predetermined physical size corresponds to a predetermined length of print media along a media feed path.

12. The method of claim 11, wherein the predetermined length ranges from approximately 0.5 to 2.0 mm.

13. The method of claim 11, wherein the predetermined length ranges from approximately 1.0 to 1.25 mm.

14. The method of claim 10, wherein the data represents a bitmap comprising one or more dot rows, and the predetermined physical size corresponds to a predetermined number of dot rows of the bitmap.

15. The method of claim 14, wherein the predetermined number of dot rows range from approximately 4 to 16.

16. The method of claim 14, wherein the predetermined number of dot rows range from approximately 8 to 10.

17. The method of claim 1, further comprising:
   electronically by a computer or processor, determining if a portion of print media required to print the first data portion and a portion of print media required to print the second data portion meet one or more predetermined criteria; and
   electronically by a computer or processor, designating the first data portion for printing by the first print head and the second data portion for printing by the second print head when the one or more predetermined criteria are met.

18. The method of claim 17, wherein at least one of the one or more predetermined criteria require the portion of print media required to print the first data portion and the portion of print media required to print the second data portion to differ in size by a predetermined amount.

19. The method of claim 18, wherein the predetermined amount corresponds to a predetermined length of print media along a media feed path.

20. The method of claim 18, wherein the data represents a bitmap comprising one or more dot rows, and the predetermined amount corresponds to a predetermined number of dot rows of the bitmap.

21. The method of claim 18, wherein the predetermined amount corresponds to a portion of print media required to print predefined print data.

22. The method of claim 21, wherein the predefined print data comprises one or more of a coupon, a logo, a serialized cartoon, a condition of sale, a graphic, an advertisement, a security feature, rebate information, contest information, ticket information, and legal information.

23. A method of splitting data for printing by a first and a second print head of a two-sided printer, the method comprising:
   electronically by a computer or processor, identifying a portion of the data transverse to a print direction comprising no information for printing;
   electronically by a computer or processor, designating a first portion of the data for printing by the first print head before the portion of the data transverse to the print direction comprising no information for printing is identified; and
   electronically by a computer or processor, designating a portion of the data for printing by the second print head after the portion of the data transverse to the print direction comprising no information for printing has been identified.

24. A method of splitting data representative of one or more discrete graphic print elements for printing by a first and a second print head of a two-sided printer, the method comprising:
   electronically by a computer or processor, identifying data representative of one or more regions in or between the discrete graphic print elements transverse to a print direction; and
   electronically by a computer or processor, splitting the data into (a) a first data portion for printing by the first print head before data representative of one or more regions in or between the discrete graphic print elements transverse to a print direction is identified, and (ii) a second data portion for printing by the second print head after data representative of one or more regions in or between the discrete graphic print elements transverse to a print direction has been identified.

25. A method of splitting data representative of a bitmap for printing on a first and a second side of two-sided media by a first and a second print head of a two-sided printer, wherein the bitmap comprises a plurality of dot rows and each dot row comprises a plurality of dots designated for printing and/or no-printing, the method comprising:
   electronically by a computer or processor, identifying one or more contiguous dot rows meeting one or more predetermined criteria; and
   electronically by a computer or processor, splitting the data into (i) a first data portion for printing by the first print head before one or more contiguous dot rows meeting one or more predetermined criteria is identified, and (ii) a second data portion for printing by the second print head after one or more dot rows meeting one or more predetermined criteria has been identified.

26. The method of claim 25, wherein at least one of the one or more predetermined criteria requires each of the contiguous dot rows to have less than or equal to a predetermined number of dots designated for printing.

27. The method of claim 26, wherein the predetermined number of dots equals zero or one.

28. The method of claim 25, wherein at least one of the one or more predetermined criteria requires each of the contiguous dot rows to have less than or equal to a predetermined percentage of dots designated for printing.

29. The method of claim 28, wherein the predetermined percentage of dots equals zero, one, or two percent.

30. The method of claim 25, wherein at least one of the one or more predetermined criteria requires the one or more contiguous dot rows to represent a predetermined length of media along a media feed path.

31. The method of claim 30, wherein the predetermined length ranges from approximately 0.5 to 2.0 mm.

32. The method of claim 30, wherein the predetermined length ranges from approximately 1.0 to 1.25 mm.

33. The method of claim 25, wherein electronically by a computer or processor, identifying one or more contiguous dot rows meeting one or more predetermined criteria comprises electronically by a computer or processor, identifying a predetermined number of contiguous dot rows meeting one or more predetermined criteria.

34. The method of claim 30, wherein the predetermined number of contiguous dot rows range from approximately 4 to 16.

35. The method of claim 30, wherein the predetermined number of contiguous dot rows range from approximately 8 to 10.

36. A two-sided direct thermal printer comprising:
   a first thermal print head on a first side of a media feed path;
   a second thermal print head on a second side of the media feed path, opposite the first side;
   a communication controller adapted to receive data for printing by the two-sided direct thermal printer; and
   a processor adapted to (i) identify a portion of the data transverse to a print direction comprising no information for printing, (ii) designate a first portion of the data for printing by the first thermal print head before the portion of the data transverse to a print direction comprising no information for printing is identified, and (iii) designate a second portion of the data for printing by the second thermal print head after the portion of the data transverse to a print direction comprising no information for printing has been identified.

37. The two-sided direct thermal printer of claim 36, further comprising a print buffer adapted to store the received data.

38. The two-sided direct thermal printer of claim 37, further comprising:
 a first memory; and
 a second memory, wherein the first memory is adapted to store the first portion of the data and the second memory is adapted to store the second portion of the data.

* * * * *